United States Patent
Ferro

Patent Number: 5,436,841
Date of Patent: Jul. 25, 1995

[54] METHOD AND DEVICE FOR DETERMINING THE RELATIVE POSITION AND THE RELATIVE PATH OF TWO SPACE VEHICLES

[75] Inventor: Daniel Ferro, Toulouse, France

[73] Assignee: Aerospatiale Societe Nationale Industrielle, Paris, France

[21] Appl. No.: 29,416

[22] Filed: Mar. 10, 1993

[30] Foreign Application Priority Data

Mar. 16, 1992 [FR] France .................. 92 03094

[51] Int. Cl.⁶ .................... G06F 165/00; B64G 3/00
[52] U.S. Cl. ........................ 364/459; 364/516; 348/117; 244/161
[58] Field of Search ............... 364/459, 559, 516, 458, 364/460, 462, 434; 348/117, 135, 140, 142; 244/161; 356/8, 21, 154

[56] References Cited

U.S. PATENT DOCUMENTS

| | | | |
|---|---|---|---|
| 3,910,533 | 10/1975 | Cheatham et al. | 244/161 |
| 4,591,987 | 5/1986 | Brown | 364/458 |
| 4,834,531 | 5/1989 | Ward | 356/5 |
| 4,898,349 | 2/1990 | Miller | 244/161 |
| 5,130,934 | 7/1992 | Ikeuchi | 364/516 |

FOREIGN PATENT DOCUMENTS 4019214 12/1991 Germany.
1-305312 12/1989 Japan.

*Primary Examiner*—Michael Zanelli
*Attorney, Agent, or Firm*—Marshall, O'Toole, Gerstein, Murray & Borun

[57] ABSTRACT

A method and device for determining the relative position and the natural relative path of an approaching space vehicle with respect to an approached space vehicle. At each of two successive instants t1 and t2, the apparent position and apparent magnitude of the approached space vehicle are measured, and the position of the reference point (o) of the approaching space vehicle is calculated. The components of the relative velocity of the approaching space vehicle with respect to the approached space vehicle are calculated; and the position coordinates of the reference point tied to the approaching space vehicle are calculated at an arbitrary instant t.

9 Claims, 2 Drawing Sheets

METHOD AND DEVICE FOR DETERMINING THE RELATIVE POSITION AND THE RELATIVE PATH OF TWO SPACE VEHICLES

The present invention relates to a method and a device for determining the relative position and the natural relative path of an approaching space vehicle with respect to an approached space vehicle. "Natural relative path" is understood hereafter as meaning that, during the determination of position and path in accordance with the invention, neither the approached space vehicle nor the approaching space vehicle are subjected to deliberate maneuvers, said space vehicles then freely describing their respective orbits. Furthermore, as will emerge clearly in the sequel, the present invention relates just as much to the case where the approaching space vehicle is pursuing the approached space vehicle as to the case where the approaching space vehicle is ahead of the approached space vehicle and is braked so as to be joined by the latter.

BACKGROUND OF THE INVENTION

It is known that, in particular with a view to a space rendezvous between an approaching space vehicle and an approached space vehicle, it is important to ascertain the current relative position and current relative natural path of the two space vehicles. Various procedures have been implemented to this end hitherto.

For example, a radar may be stowed aboard the approaching space vehicle. However, the mass, cost and electricity consumption of the radar are sizable, so that they constitute forbidding constraints in respect of certain space vehicles.

Furthermore, use can be made of the GPS (Global Positioning System) network of positioning satellites. However, this solution includes some unknowns related to the degree of ignorance about the performance and reliability characteristics of the GPS system. To be specific, the GPS process requires special equipment stowed on each of the space vehicles.

It is also possible to carry out sightings from the ground by radar or theodolites and orbit-plotting calculations in order to determine the sought-after speed and path. However, this results in a great dependency on the ground infrastructures and a high degree of inaccuracy for relative distances below 20 km.

The object of the present invention is to remedy these disadvantages. It relates to a system which is simple, reliable, robust, accurate, independent of ground infrastructures and which can be easily stowed aboard a space vehicle, being of low mass and consuming little electrical energy.

SUMMARY OF THE INVENTION

To this effect, according to the invention, the method for determining the relative position and the natural relative path of an approaching space vehicle with respect to an approached space vehicle, said approaching and approached space vehicles being in parts of their respective orbits in which their velocity vectors with respect to the geocentric frame of reference are at least approximately parallel and said approached space vehicle being triaxially stabilized in its orbit, is noteworthy in that from said approaching space vehicle, said approached space vehicle is observed in a plane tied to said approaching space vehicle, orthogonal to the axis of the means of observation and passing through a reference point of said approaching space vehicle;

at each of two successive instants t1 and t2:

the apparent position of said approached space vehicle is measured in said plane and with respect to said reference point of said approaching space vehicle;

the apparent size of said approached space vehicle is measured in said plane; and with the aid of said measurements of apparent position and apparent size, as well as of the true size of said approached vehicle, the position of said reference point of said approaching space vehicle is calculated in a system of reference axes tied to said approached space vehicle;

from the two positions of said reference point, calculated at the instants t1 and t2, as well as from the known characteristics of movement of said approached space vehicle in its orbit, the components of the relative velocity of said approaching space vehicle with respect to said approached space vehicle are calculated at the instant t1 in said system of reference axes tied to said approached space vehicle; and from the position of said reference point, calculated at the instant t1, and from said components of relative velocity, likewise calculated at the instant t1, the position coordinates of said reference point tied to said approaching space vehicle are calculated at an arbitrary instant t in said system of reference axes tied to said approached space vehicle.

Thus, by virtue of the measurement of the apparent size of the approached space vehicle, the distance separating said space vehicles is taken into account, whilst the determination of the apparent position of the approached space vehicle with respect to the approaching space vehicle, in the vertical and horizontal planes, enables said approached space vehicle to be located accurately.

In particular, when the approached space vehicle has a known, sizable horizontal wingspan L, for example because it includes solar panels unfolded orthogonally to the orbital plane, it is advantageous:

that, at each of said instants t1 and t2:

the value s1 or s2, respectively, of the elevation of the origin of said system of reference axes, tied to said approached space vehicle, is measured with respect to said reference point tied to said approaching space vehicle;

the values ag1, ad1 or ag2, ad2 of the azimuths of the left and right tips of the approached space vehicle are measured with respect to said reference point tied to said approaching space vehicle;

the respective position coordinates X1, Y1, Z1 and X2, Y2 and Z2 of said reference point tied to said approaching space vehicle, in said system of reference axes tied to said approached space vehicle, are calculated from the wingspan L and from the measurements of elevation and of azimuth s1, ag1, ad1 and s2, ag2, ad2 respectively;

that the components Xp1, Yp1 and Zp1, at the instant t1, of the relative velocity of said approaching space vehicle with respect to said approached space vehicle are calculated, in said system of reference axes tied to said approached space vehicle, from the position coordinates X1, Y1, Z1 and X2, Y2, Z2, calculated at the instants t1 and t2, as well as from the known characteristics of movement of said approached space vehicle in its orbit; and that the position coordinates X(t), Y(t) and Z(t) of said reference point tied to said approaching space vehicle are calculated at an arbitrary instant t from the position coordinates X1, Y1, Z1 and from the velocity components Xp1, Yp1 and Zp1, calculated at the instant t1.

If the approaching space vehicle is manned, the observation of said approached space vehicle could be made by eye. However, whether or not the approaching space vehicle is manned, it is preferable, so as to be able to automate the measurements of apparent position and apparent size, for observation of said approached space vehicle to be made by way of a filming device delivering an image on the scale of that which would be obtained in the case of direct observation which would enable, for example by virtue of appropriate graduated scales superimposed on the image, the necessary measurements of elevation and azimuth to be made.

Of course, if the optical axis of said filming device is offset with respect to the velocity vector of said approaching space vehicle, corresponding correction values are accorded to the values of elevation and of azimuth s1, s2, ag1, ad1, ag2 and ad2, before calculating the coordinates X1, Y1, Z1, X2, Y2 and Z2.

The present invention also relates to a device for determining the relative position and the natural relative path of an approaching space vehicle with respect to an approached space vehicle, said approaching and approached space vehicles being in parts of their respective orbits in which their velocity vectors are at least approximately parallel in terms of geocentric references and said approached space vehicle being triaxially stabilized in its orbit.

According to the invention, this device is noteworthy in that it includes:

means of observation mounted aboard said approaching vehicle, and observing said approached space vehicle, in a plane tied to said approaching space vehicle, orthogonal to the axis of the means of observation and passing through a reference point of said approaching space vehicle;

measuring means for measuring, at each of two successive instants t1 and t2:

the apparent position of a point characteristic of said approached space vehicle located in the vicinity of its center of gravity, in said plane and with respect to said reference point of said approaching space vehicle; and the apparent size of said approached space vehicle, in said plane;

first calculating means for calculating, at each of said instants t1 and t2, with the aid of said measurements of apparent position and apparent size, as well as of the true size of said approached vehicle, the position of said reference point of said approaching space vehicle in a system of reference axes tied to said approached space vehicle;

second calculating means for calculating, from the two positions of said reference point, calculated at the instants t1 and t2, as well as from the known characteristics of movement of said approached space vehicle in its orbit, the components of the relative velocity of said approaching space vehicle with respect to said approached space vehicle at the instant t1 in said system of reference axes tied to said approached space vehicle; and third calculating means for calculating, from the position of said reference point, calculated at the instant t1, and from said components of relative velocity, likewise calculated at the instant t1, the position coordinates of said reference point tied to said approaching space vehicle at an arbitrary instant t in said system of reference axes tied to said approached space vehicle.

In the case where said approached space vehicle has a known, sizable horizontal wingspan L, it is advantageous:

that, at each of said instants t1 and t2, said measuring means:

measure the value s1 or s2, respectively, of the elevation of the origin of said system of reference axes, tied to said approached space vehicle, with respect to said reference point tied to said approaching space vehicle; and measure, respectively, the values ag1, ad1 or ag2, ad2 of the azimuths of the left and right tips of the approached space vehicle with respect to said reference point tied to said approaching space vehicle;

that said first calculating means calculate the respective position coordinates X1, Y1, Z1 and X2, Y2 and Z2 of said reference point tied to said approaching space vehicle, in said system of reference axes tied to said approached space vehicle, from the wingspan L and from the measurements of elevation and of azimuth s1, ag1, ad1 or s2, ag2, ad2 respectively;

that said second calculating means calculate the components Xp1, Yp1 and Zp1 of the relative velocity of said approaching space vehicle with respect to said approached space vehicle, in said system of reference axes tied to said approached space vehicle, from the position coordinates X1, Y1, Z1 and X2, Y2, Z2, calculated at the instants t1 and t2, as well as from the known characteristics of movement of said approached space vehicle in its orbit; and that said third calculating means calculate the position coordinates X(t), Y(t) and Z(t) of said reference point tied to said approaching space vehicle at an arbitrary instant t from the position coordinates X1, Y1, Z1 and from the velocity components Xp1, Yp1 and Zp1, calculated at the instant t1.

Although said measuring means may take a number of forms, in an advantageous embodiment they include a television device associated with said filming device and provided with a screen, each point of which can be identified by the position of a mobile crosshair which can be moved under the action of a control member.

BRIEF DESCRIPTION OF THE DRAWINGS

The figures of the attached drawing will make quite clear how the invention can be effected. In these figures, identical references denote like elements.

DESCRIPTION OF THE PREFERRED EMBODIMENT

Figure 1:
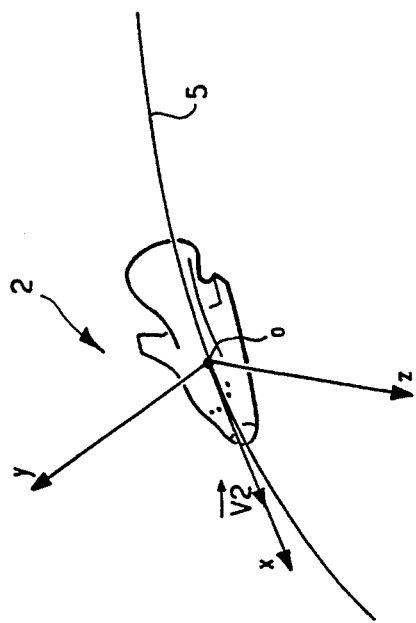
FIG. 1 illustrates diagrammatically two space vehicles in the approach phase.
Figure 1:
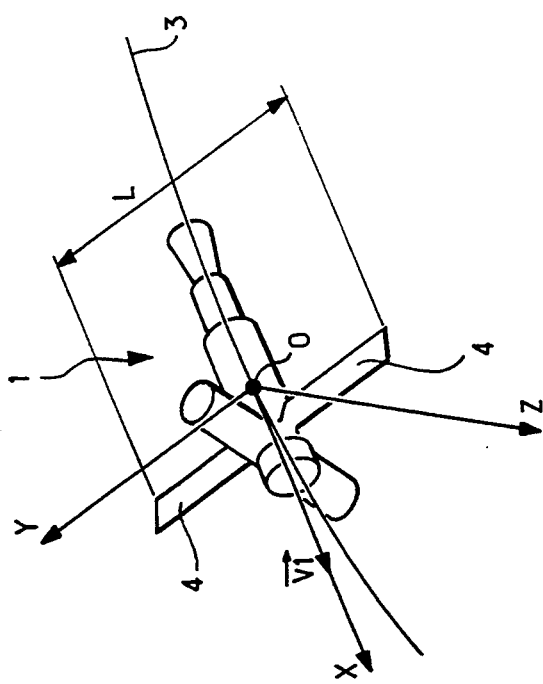

Two space vehicles 1 and 2 in the phase preparatory to a rendezvous have been represented in FIG. 1.

The space vehicle 1, for example a manned space station, describes an orbit 3. Such an orbit 3 may be circular about the Earth (not represented) and the space vehicle 1 may describe the orbit 3 in a uniform manner, so that the space vehicle 1 is then in uniform rotation about the Earth. A local orbital frame of reference OX, OY, OZ, accompanying said space vehicle 1 in its rotational motion about the Earth, is tied to space vehicle 1. The origin O of said local orbital frame of reference can be the center of gravity of space vehicle 1, whilst the vertical axis OZ of said frame of reference is always directed towards the center of the Earth, during the rotational motion of said space vehicle 1 in its orbit 3. The OX axis of said local orbital frame of reference is oriented along the velocity vector $\vec{V1}$ (with respect to the Earth) of space vehicle 1 traveling in its orbit 3. The OX axis is therefore tangential to said orbit 3 and contained in the plane of the latter. The space vehicle 1 is triaxially stabilized in its orbit 3. It includes solar panels 4, whose known wingspan L is always parallel to the OY axis, orthogonal to the OX and OZ axes. The OX, OY plane defines the horizontal plane of space vehicle 1.

The space vehicle 2, for example a manned space shuttle, describes an orbit 5. A local orbital frame of reference ox, oy, oz, accompanying said space vehicle 2 in its motion along its orbit 5, is tied to space vehicle 2. The origin o of the latter local orbital frame of reference can be the center of gravity of space vehicle 2, whilst the vertical axis oz is always directed towards the center of the Earth, during the motion of said space vehicle 2 in its orbit 5. The ox axis is oriented along the velocity vector $\vec{V2}$ (with respect to the Earth) of space vehicle 2 in its orbit 5. The ox axis is thus tangential to the orbit 5 and contained in the plane of the latter. The oy axis is orthogonal to the ox and oz axes and the ox,oy plane is horizontal.

FIG. 1 illustrates the case of a rendezvous in which the approaching space vehicle (vehicle 2) is pursuing the approached space vehicle (vehicle 1). Evidently, however, the present invention is also applicable to the case where the approaching vehicle is being caught up with by the approached space vehicle.

Figure 2:
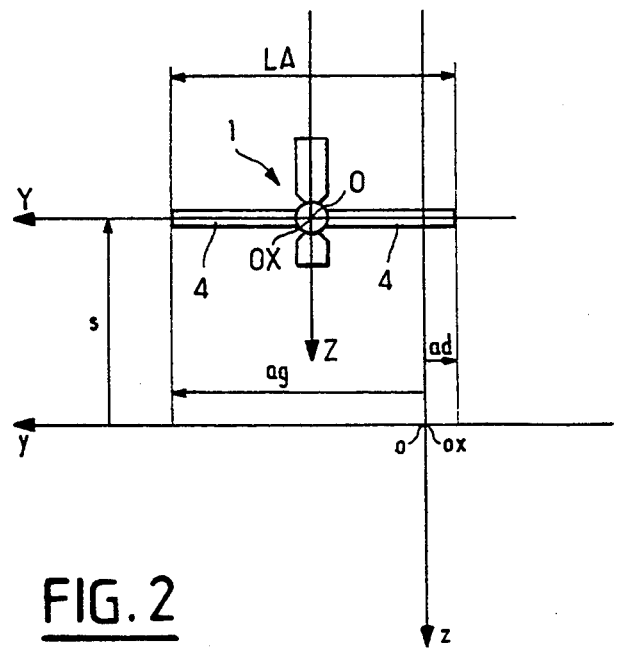
FIG. 2 is a diagram illustrating the principle of the present invention.

If the OX and ox axes are parallel and if, from space vehicle 2, a sighting is performed along the ox axis in the direction of space vehicle 1, the situation shown by FIG. 2 is obtained.

In this sighting, space vehicle 1 appears with an apparent wingspan LA in respect of its solar panels 4 (of true wingspan L), in a position offset with respect to the frame of reference ox,oy,oz. Of course, the apparent wingspan LA is directly representative of the distance D separating the two space vehicles 1 and 2.

The position of space vehicle 1, with respect to the frame of reference ox,oy,oz tied to space vehicle 2, can be defined by:

the angle of elevation s between the horizontal plane ox,oy and the center 0 of space vehicle 1;
the angle of azimuth ag between the vertical plane ox,oz and the left tip of the solar panels 4; and
the angle of azimuth ad between the vertical plane ox,oz and the right tip of the solar panels 4.

Each of these three angles could, for example, be measured by the rotation of an orientable sighting telescope (not represented) moved between a reference position, for which its optical axis coincides with the ox axis, and a sighting position, for which said optical axis is directed, respectively, towards the OY axis and the tips of said solar panels 4. Other measuring means, bearing the reference 11, are described in connection with FIG. 3.

A simple calculation shows that, in the frame of reference OX,OY,OX tied to space vehicle 1, the coordinates of the relative position X, Y and Z of the reference point o tied to space vehicle 2 are respectively:

$$X = \frac{L}{\cos s \cdot |\tan ag - \tan ad|} \times$$

$$\text{sign of} \left[ \frac{\pi}{2} - \left| \frac{ag + ad}{2} - \pi \right| \right]$$

$$Y = \frac{L \cdot \tan(ag + ad)/2}{|\tan ag - \tan ad|} \times$$

$$\text{sign of} \left[ \frac{\pi}{2} - \left| \frac{ag + ad}{2} - \pi \right| \right]$$

$$Z = \frac{L \cdot \tan s}{\cos s \cdot |\tan ag - \tan ad|}$$

Of course, the distance D can then be calculated through the formula $$D = \sqrt{(X^2 + Y^2 + Z^2)}$$

According to the invention, in order to determine the natural relative path of space vehicle 2 with respect to space vehicle 1, the value of the coordinates X, Y and Z is calculated, at two successive instants t1 and t2, by the above process. Two groups of values X1,Y1,Z1 and X2,Y2,Z2 are therefore obtained, from which it is possible to determine, at the instant t1, the components Xp1, Yp1, Zp1 of the relative velocity of space vehicle 2 in the frame of reference OX, OY, OZ. The time shift between the instants t1 and t2 is chosen so that the coordinates X1,Y1,Z1 and X2,Y2,Z2 correspond to a sufficient change of position in respect of space vehicle 2 for the measurement to be significant.

Next, by virtue of knowing, at the instant t1, the position coordinates X1,Y1,Z1 and the velocity components Xp1, Yp1 and Zp1, it is possible to predict the future relative path of space vehicle 2.

In the case mentioned above where the orbit 3 is circular and is described in a uniform manner by space vehicle 1, with an orbital angular frequency equal to $\omega$, it is found through a simple calculation that:

$$Xp1 = \frac{DE - BF}{\Delta}$$

$$Yp1 = \frac{Y2 - Y1 \cos[\omega(t2 - t1)]}{\sin[\omega(t2 - t1)]}$$

$$Zp1 = \frac{AF - CE}{\Delta}$$

with:

$\Delta = 8 - 8 \cos[\omega(t2-t1)] - 3\omega(t2-t1) \sin[\omega(t2-t1)]$
$A = (4/\omega) \sin[\omega(t2-t1)] - 3(t2-t1)$ $B = (2/\omega)\{\cos[\omega(t2-t1)]-1\}$
$C = -B$
$D = \{\sin[\omega(t2-t1)]\}/\omega$
$E = X2 - X1 + \{6\sin[\omega(t2-t1)] - 6\omega(t2-t1)\}Z1$
$F = Z2 + \{3\cos[\omega(t2-t1)] - 4\}Z1$ Since the position X1, Y1, Z1 and the velocity Xp1, Yp1 and Zp1, at the instant t1, of the approaching space vehicle 2 with respect to the approached space vehicle 1 are known, it is possible to predict the future natural path, calculating it point by point.

At an arbitrary instant 2, the position X(t), Y(t), Z(t) of space vehicle 2 with respect to space vehicle 1 will be:

$X(t) = X1 - 2/\omega \{Zp1 \cos[\omega(t - t1)] +$ $(3\omega Z1 - 2Xp1)\sin[\omega(t - t1)]\} + 3/2(4\omega Z1 - 2Xp1)(t - t1) +$ $2Zp1/\omega$ $Y(t) = Y1 \cos[\omega(t - t1)] + Yp1/\frac{\omega}{\sin}[\omega(t - t1)]$ $Z(t) = 1/\omega \{Zp1 \sin[\omega(t - t1)] -$ $(3\omega Z1 - 2Xp1)\cos[\omega(t - t1)] + 4\omega Z1 - 2Xp1\}$ In the preceding calculations it was assumed that the sighting was made parallel to the E axis and that the angle of roll of the approaching space vehicle 2 was zero. Of course, if the sighting (for example performed, as is indicated below, with the aid of a camera whose optical axis might not coincide with the ox axis) is not parallel to the ox axis and/or if the angle of roll of space vehicle 2 is not zero, corrective procedures are introduced with regard to the calculation of X1,Y1,Z1 and X2,Y2,Z2.

Figure 3:
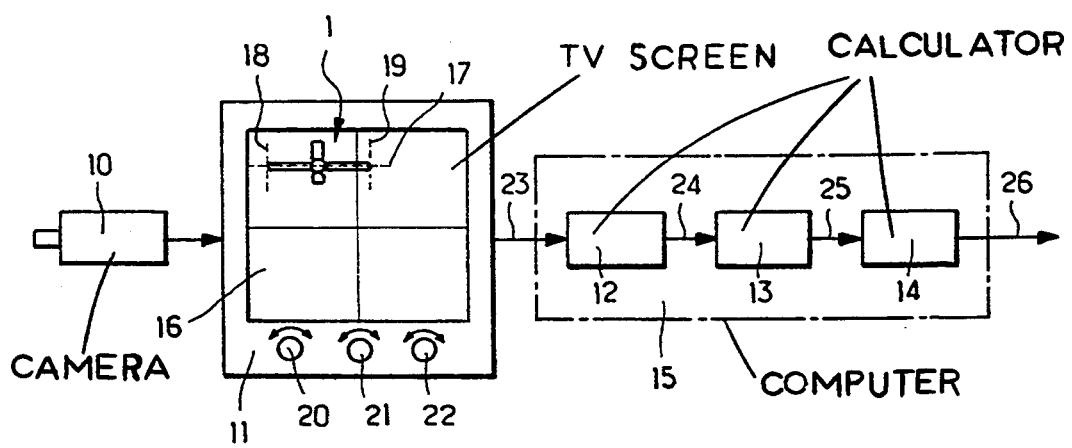
FIG. 3 shows the block diagram of a device according to the present invention.

An embodiment of the device according to the present invention has been represented in FIG. 3. This embodiment, mounted aboard space vehicle 2, includes a camera 10 observing space vehicle 1, a television device 11 and three calculating means 12, 13 and 14, optionally grouped together in a single computer 15.

The television device 11 includes a screen 16 and it is of the type in which crosshairs 17, 18 and 19, mobile respectively under the action of control members 20, 21, 22 (for example rotary knobs), can be moved over said screen 16 while indicating their position on the latter.

Thus, the camera 10 forms, on the screen 16, an apparent image of space vehicle 1 whose size is to the scale of the apparent size which would result from a direct observation of said space vehicle 1, from space vehicle 2. At the instant t1, the control member 20 is actuated in order that the crosshair 17 pass through the horizontal midplane of said image, so that the television device 11 knows the elevation value s1. At the same instant t1, the control members 21 and 22 are likewise actuated, in order that the crosshairs 18 and 19 be brought onto the left and right tips of the wingspan of said image of vehicle 1. The azimuth measurements ag1 and ad1 are therefore obtained. At the instant t2, in analogous manner, said crosshairs 17, 18 and 19 are moved so that the television device 11 now knows the measurements s2, ag2 and ad2.

These measurements s1, s2, ag1, ad1, ag2 and ad2 are forwarded to the calculating means 12 (link 23) knowing the wingspan L, which calculate the coordinates X1,Y1,Z1 and X2,Y2,Z2 in the manner described above. These coordinates are, in their turn, transmitted to the calculating means 13 (link 24), knowing the angular frequency, which determine, as has been mentioned, the velocity components Xp1, Yp1 and Zp1.

Finally, via link 25, the coordinates X1,Y1,Z1 and the components Xp1, Yp1 and Zp1 are transmitted to the calculating means 14 which deliver X(t), Y(t) and Z(t) at their output 26.

Of course, the device described in connection with FIG. 3 is merely one possible embodiment of the device according to the present invention. Indeed, for example, the television device 11 could be replaced with an automatic image analysis device with a view to the complete automation of the device of the invention, or else the assembly of the camera 10 and of the television device 11 could be replaced with a graduated collimator system or a head-up visor, for the human capture of the measurements s1, s2, ag1, ag2, ad1 and ad2, which would later be input into the computer 15.

I claim:

1. A method for determining the relative position and the natural relative path of an approaching space vehicle (2) with respect to an approached space vehicle (1), each of said approaching and approached space vehicles being in a part of their respective orbits (5, 3) in which their velocity vectors ($\overline{V2}$, $\overline{V1}$) are at least approximately parallel, said approached space vehicle (1) being triaxially stabilized in its orbit (3), said method comprising the steps of:

from said approaching space vehicle (2), observing through means of observation having an axis, said approached space vehicle (1) in a plane (oy, oz) tied to said approaching space vehicle, said plane being orthogonal to the axis of the means of observation and passing through a reference point (o) of said approaching space vehicle;

measuring at each of two successive instants t1 and t2 the apparent position of said approached space vehicle in said plane and with respect to said reference point (o) of said approaching space vehicle;

measuring the apparent size of said approached space vehicle in said plane; and with the aid of said measurements of apparent position and apparent size, as well as of the known true size of said approached space vehicle, calculating the position of said reference point (o) of said approaching space vehicle in a system of reference axes (OX, OY, OZ) tied to said approached space vehicle;

from the two positions of said reference point (o), calculated at the instants t1 and t2, as well as from the known characteristics of movement of said approached space vehicle in its orbit, calculating the components of the relative velocity of said approaching space vehicle with respect to said approached space vehicle at the instant t1 in said system of reference axes (OX, OY, OZ) tied to said approached space vehicle; and from the position of said reference point, calculated at the instant t1, and from said components of relative velocity, likewise calculated at the instant t1, calculating the position coordinates of said reference point (o) to said approaching space vehicle at an arbitrary instant t in said system of reference axes tied to said approached space vehicle.

2. The method as claimed in claim 1, applied to the case where said approached space vehicle includes a sizable, known horizontal wingspan L having left and right tips wherein:

at each of said instants t1 and t2:

the value s1 or s2, respectively, of the elevation of the origin (O) of said system of reference axes, tied to said approached space vehicle, is measured with respect to said reference point (o) tied to said approaching space vehicle;

the values ag1, ad1 or ag2, ad2 of the azimuths of the left and right tips of the approached space vehicle are measured with respect to said reference point tied to said approaching space vehicle;

the respective position coordinates X1, Y1, Z1 and X2, Y2, Z2 of said reference point tied to said approaching space vehicle, in said system of reference axes tied to said approached space vehicle, are calculated from the wingspan L and from the measurements of elevation and of azimuth s1, ag1, ad1 and s2, ag2, ad2 respectively;

the components Xp1, Yp1 and Zp1, at the instant t1, of the relative velocity of said approaching space vehicle with respect to said approached space vehicle are calculated, in said system of reference axes tied to said approached space vehicle, from the position coordinates X1, Y1, Z1 and X2, Y2, Z2, calculated at the instants t1 and t2, as well as from the known characteristics of movement of said approached space vehicle in its orbit; and the position coordinates X(t), Y(t) and Z(t) of said reference point tied to said approaching space vehicle are calculated at an arbitrary instant t from the position coordinates X1, Y1, Z1 and from the velocity components Xp1, Yp1 and Zp1, calculated at the instant t1.

3. The method as claimed in claim 2, wherein the observation of said approached space vehicle is made by way of a filming device delivering an image whose size is to the scale of the apparent size which would result from a direct observation.

4. The method as claimed in claim 3, in which the optical axis of said filming device is offset with respect to the velocity vector of said approaching space vehicle, wherein corresponding correction values are accorded to the values of elevation and of azimuth s1, s2, ag1, ad1, ag2 and ad2, before calculating the coordinates X1, Y1, Z1, X2, Y2 and Z2.

5. The method as claimed in claim 2, in which said approached space vehicle describes a circular orbit in a uniform manner with an angular frequency $\omega$, wherein the components of relative velocity Xp1, Yp1 and Zp1 are respectively equal to:

$$Xp1 = \frac{DE - BF}{\Delta}$$

$$Yp1 = \frac{Y2 - Y1 \cos[\omega(t2 - t1)]}{\sin[\omega(t2 - t1)]}$$

$$Zp1 = \frac{AF - CE}{\Delta}$$

with:
$\Delta = 8-8 \cos[\omega(t2-t1)] - 3\omega(t2-t1) \sin[\omega(t2-t1)]$
$A = (4/\omega) \sin[\omega(t2-t1)] - 3(t2-t1)$
$B = (2/\omega) \{\cos[\omega(t2-t1)] - 1\}$
$C = -B$
$D = \{\sin[\omega(t2-t1)]\}/\omega$
$E = X2 - X1 + \{6 \sin[\omega(t2-t1)] - 6\omega(t2-t1)\}Z1$
$F = Z2 + \{3 \cos[\omega(t2-t1)] - 4\}Z1$.

6. The method as claimed in claim 5, wherein the position coordinates X(t), Y(t) and Z(t) are respectively equal to:

$$X(t) = X1 - 2/\omega \{Zp1 \cos[\omega(t - t1)] +$$
$$(3\omega Z1 - 2Xp1)\sin[\omega(t - t1)]\} + 3/2(4\omega Z1 - 2Xp1)(t - t1) +$$
$$2Zp1/\omega$$

$$Y(t) = Y1 \cos[\omega(t - t1)] + Yp1/\omega \sin[\omega(t - t1)]$$

$$Z(t) = 1/\omega \{Zp1 \sin[\omega(t - t1)] -$$
$$(3\omega Z1 - 2Xp1) \cos[\omega(t - t1)] + 4\omega Z1 - 2Xp1\}$$

7. A device for determining the relative position and the natural relative path of an approaching space vehicle (2) with respect to an approached space vehicle (1), each of said approaching and approached space vehicles being in a part of their respective orbits (5, 3) in which their velocity vectors ($\overline{V2}$, $\overline{V1}$) with respect to the geocentric frame of reference are at least approximately parallel, said approached space vehicle being triaxially stabilized in its orbit, said device including:

means of observation (10) having an axis mounted aboard said approaching space vehicle (2), and observing said approached space vehicle (1), in a plane (oz, oy) tied to said approaching space vehicle, orthogonal to the axis of the means of observation and passing through a reference point (o) of said approaching space vehicle;

measuring means (11) for measuring, at each of two successive instants t1 and t2 the apparent position of said approached space vehicle in said plane and with respect to said reference point of said approaching space vehicle, and the apparent size of said approached space vehicle, in said plane;

first calculating means (12) for calculating, at each of said instants t1 and t2, with the aid of said measurements of apparent position and apparent size, as well as of the known true size of said approached space vehicle, the position of said reference point of said approached space vehicle in a system of reference axes tied to said approached space vehicle;

second calculating means (13) for calculating, from the two positions of said reference point, calculated at the instants t1 and t2, as well as from the known characteristics of movement of said approached space vehicle in its orbit, the components of the relative velocity of said approaching space vehicle with respect to said approached space vehicle at the instant t1 in said system of reference axes tied to said approached space vehicle; and third calculating means (14) for calculating, from the position of said reference point, calculated at the instant t1, and from said components of relative velocity, likewise calculated at the instant t1, the position coordinates of said reference point tied to said approaching space vehicle at an arbitrary instant t in said system of reference axes tied to said approached space vehicle.

8. The device as claimed in claim 7, wherein said means of observation include a filming device (10) delivering an image whose size is to the scale of the apparent size which would result from a direct observation.

9. The device as claimed in claim 7, wherein said measuring means (11) include a television device provided with a screen (16), each point of which can be identified by the position of a mobile crosshair (17, 18, 19) which can be moved under the action of a control member (20, 21, 22).

* * * * *